Patented Mar. 27, 1934

1,952,843

UNITED STATES PATENT OFFICE 1,952,843

MANUFACTURE AND TREATMENT OF CELLULOSE ESTERS

Henry Dreyfus, London, England

No Drawing. Application July 16, 1929, Serial No. 378,807. In Great Britain August 13, 1928

20 Claims. (Cl. 260—102)

This invention relates to a new or improved process for the manufacture of cellulose acetates or other cellulose esters and particularly cellulose esters of fatty acids, for example propionic acid or butyric acid and the like, and further relates to an improved process whereby primary cellulose acetates or other cellulose esters may be treated in suspension for the purpose of changing their solubilities, the said treatment being generally termed ripening or secondary treatment.

Many proposals have in the past been made for acetylating or otherwise esterifying cellulose in suspension in organic diluents which are non-solvents for the cellulose esters produced, for example benzene, toluene or the like. Various unsuccessful attempts have been made to treat the primary esterification products thus obtained for the purpose of changing their solubilities. It has been suggested to continue the ripening in the esterification suspension, but I have found that it is impossible by ripening in such diluents as benzene and toluene to obtain products similar to those obtained by esterifying and ripening in solution. Particularly is this the case when sulphuric acid or derivatives thereof have been employed as catalysts. Again the diluent has been removed from the primary esterification suspensions and the primary products suspended in aqueous acids for the purpose of ripening them or changing their solubilities. For example they have been suspended in 10% aqueous nitric acid or 10% aqueous hydrochloric acid. Whilst it is true that in such processes some change of solubility occurs, the secondary products obtained, both as regards their qualitative and quantitative solubility characteristics, are quite different from the secondary products obtained by ripening in solution and are useless for the purposes to which the esters ripened in solution are applied. Still further difficulties have been encountered when sulphuric acid or derivatives thereof have been employed as catalysts in the esterification. It appears to be practically impossible to eliminate the sulphuric acid or derivatives thereof by ripening in aqueous or benzene suspension and in consequence the secondary products obtained are not commercially useful.

In a series of researches I have undertaken on the subject of ripening cellulose esters in suspension I have discovered that the main reason that it is impossible or extremely difficult to obtain commercially valuable secondary cellulose esters in suspension is that the water or similarly acting agent necessary for carrying out the ripening or further treatment does not mix with the benzene, toluene or the like diluent, and it appears to be impossible to incorporate it in the cellulose ester suspension sufficiently well for the ripening to proceed satisfactorily. Water is practically insoluble in benzene or toluene and the amount normally taken up by these solvents is insufficient to provide the necessary water or similarly acting agent for ripening the primary esters. Further, if acetic acid be added to the benzene or like suspension of the primary esterification product in order to cause the benzene to take up more water, it is found that, before the benzene-acetic acid mixture becomes capable of taking up sufficient water to enable the ripening to be carried out, the cellulose acetate or other cellulose ester becomes soluble in the mixture and ripening in suspension is again impossible.

I have further found that the same conditions apply when other water repelling agents similar to benzene, for example toluene and carbon tetrachloride, are employed. I have found that it is essential for a satisfactory ripening in suspension that the suspending liquid shall be capable of homogeneously incorporating the definite quantities of water or similarly acting agent necessary for the ripening, these quantities of water or the like varying with the particular solubility desired. For example the quantity of water required may be 5–100% calculated upon the weight of the original cellulose or more or even less, the phase of ripening reached and the sequence of solubility phases passed through being different corresponding with the amount of water used.

I have now found that these difficulties are avoided and satisfactory ripening in suspension is obtainable, if ether or other non-solvent diluent in which the water or similarly acting agent is soluble, or with which it is miscible, to some appreciable extent, is employed as the suspending liquid.

The most satisfactory method of carrying out the operation is to acetylate or otherwise esterify cellulose in suspension in the ether or other non-solvent diluent and to utilize the suspension of the primary product obtained directly for the ripening process, the acetic anhydride or other esterifying agent being preliminarily destroyed by means of water or similarly acting agent.

It is a surprising fact that though dry ether itself is not capable of taking up very considerable quantities of water, nevertheless if the ether is employed as a suspending diluent in the esterification of cellulose, then the suspension obtained appears to be capable of taking up very substantial quantities of water without any tendency of the latter to separate out as is always the case when benzene or like water repellent liquid is employed as the suspending diluent. It is however possible to conduct the ripening process in suspension in a mixture of benzene, toluene or other water-repellent liquid and ether or other non-solvent liquid in which water is soluble to an appreciable extent, the proportions of the mixture being adjusted so that the quantity of water necessary for the ripening can be homogeneously incorporated. This constitutes a further important feature of the present invention.

It is found that by conducting the ripening treatment in suspension in ether, it is possible to cause the primary cellulose acetate or other cellulose ester to pass through phases of solubility very similar indeed to, or identical with, those passed through when the ripening treatment is carried out in solution. In addition the process of the present invention presents many other advantages, notable among which is that it is possible to preserve the original structure of the cellulosic fibre throughout the entire esterification and ripening treatment.

Again the present process presents particular advantages when sulphuric acid or derivatives thereof are employed as catalysts in the esterification, since almost complete elimination of combined $SO_3$ is possible within a comparatively short time, which, as previously indicated, was either impossible with known methods of ripening in suspension or was so difficult that the quality of the products was seriously affected and they were rendered useless.

As stated above the acetylation or other esterification is preferably carried out in the suspending liquid which is to be used for the ripening treatment. The invention is, however, not limited to such a continuous process, since the primary cellulose acetates or other cellulose esters may be obtained by any desired process. For example they may be obtained in solution by any suitable process using for example acetic acid or other solvent for the cellulose ester produced as esterification medium, the primary product being then precipitated and suspended in the ether or other somewhat hydrotropic liquid. Again, for the purpose of preserving the original fibrous structure of the cellulosic material, the esterification may be carried out in suspension in benzene, toluene or other non-solvent diluent, and the diluent then wholly or partly replaced by ether or other diluent having some solvent power for water or similarly acting ripening agent.

As initial materials for the acetylation or other esterification, cotton or other celluloses, or near conversion products thereof or other cellulosic materials may be employed. Wood pulps or bamboo, esparto or other cellulosic materials containing encrusting matters and from which the lignin, pentosan and like constituents have been substantially removed, as for example in sulphite pulp, soda pulp or sulphate pulp, may be employed, but are preferably subjected prior to esterification to a purifying treatment as described in U. S. Patent No. 1,711,110. For example the alkaline purifying treatment may be effected with caustic alkali of low concentration, such as 3% or under, with heating or boiling, or with caustic alkali of high concentration, such as 5-10% or more, in the cold or with only slight heating.

Fibres, yarns, fabrics or the like, for example of cotton or other natural cellulosic materials or of viscose or other regenerated cellulosic artificial fibres, may be acetylated or esterified and/or further treated according to the processes of the present invention. In the treatment of such products the ripening is not primarily designed for the purpose of changing the solubility characteristics of the cellulose acetate or other cellulose esters obtained but for the purpose of eliminating acids or acidic substances or catalysts which may have been used in the esterification and be present therein.

It is found that the best results are obtained particularly in the case of effecting the esterification as well as the ripening in suspension when the cellulosic materials prior to being esterified are subjected to a pretreatment for the purpose of increasing their reactivity. They may be pretreated with large or small quantities of organic acids in concentrated or dilute form, for example with concentrated or dilute formic acid or acetic acid, or vapours of such acids may be employed alone or mixed with air or other inert gas for the pretreatment.

If desired sulphuric acid or other catalysts for the esterification may be incorporated in the acetic acid or other organic acid for the pretreatment. In fact I have found that very good results indeed are obtained by employing a mixture of acetic acid and sulphuric acid for the pretreatment prior to carrying out the esterification in suspension in ether.

Other pretreatments may also be employed. For example the cellulosic material may be damped with water containing a small quantity of sulphuric acid. To obtain even distribution of the sulphuric acid the cellulosic material may be allowed to soak in dilute sulphuric acid and the main liquor hydroextracted or pressed off so as to retain in the cellulosic material only sufficient liquor to damp it.

Another form of pretreatment which I have found very effective for rendering the cellulosic material more reactive consists in subjecting the cellulosic material to the action of hydrochloric acid or other hydrohalide acid or of chloride or other halide or a mixture of the acids or of the halides or of the acids with the halide. This pretreatment with hydrohalide acids and/or halides is particularly useful when esterification is to be carried out with chloride or other halide catalysts, for example those of iron, tin, cobalt, nickel, manganese and copper, with or without hydrochloric or other hydrohalide acid.

Any two or more of the foregoing pretreatments may be combined, the treatments being conducted simultaneously or successively, for example, the pretreatment may be carried out with acetic acid or other organic acid together with sulphuric acid or a hydrohalide acid. A pretreatment not employing an organic acid or other agent which is a solvent for the cellulose ester to be produced in the esterification is to some extent an advantage when the esterification is to be conducted in suspension, in that it permits of employing smaller quantities of the non-solvent suspending diluent than would otherwise be necessary. However, even if a pretreatment with an organic acid mixed or not with another pretreating agent be employed, the organic acid may be removed, if desired, from the cellulosic material prior to the esterification.

Again the cellulosic materials may be treated with the pre-treating agent mixed with the medium to be employed in the subsequent esterification. For example glacial or dilute acetic acid in any desired quantity may be mixed with ether and employed as pretreating agent. Either the whole or part of the esterification medium may then be used and the cellulose so pretreated together with the pretreating agent subsequently mixed with the catalyst and the esterifying agent (e. g. acetic anhydride) with or without further quantities of ether.

The combined process of pretreating cellulosic materials with organic acids, in conjunction or not with sulphuric acid, hydrochloric acid, halides or other catalysts, followed by acetylation or other esterification in suspension in ether or other suspending liquid referred to, forms an important feature of the present invention.

As stated above, the esterification may be carried out, if desired, in solution but is preferably conducted in suspension and more particularly in suspension in a liquid which is to be employed according to the process of the present invention as suspending liquid in the subsequent ripening treatment. An esterification in suspension may be effected in presence or absence of small or relatively large quantities of a solvent (e. g. acetic acid) or solvents for the ester produced. In employing such a solvent, larger quantities of nonsolvent diluent will be necessary to prevent solution of the cellulose ester produced. For the esterification any desired catalysts may be employed for example sulphuric acid or organically substituted sulphuric acids, for instance benzene sulphonic acid or bisulphates, e. g. sodium bisulphates, may be employed, and as indicated above the ripening treatment according to the present invention presents particular advantages when sulphuric acid or derivatives thereof are employed in the esterification, since it admits of a ready elimination of combined $SO_3$, but any other suitable catalysts may be used. For example I may use (a) zinc halide in conjunction with hydrohalide acid, e. g. zinc chloride and hydrochloric acid; (b) halides and particularly chlorides of iron (especially ferric), manganese, cobalt, nickel or copper in conjunction with hydrochloric or other hydrohalide acid, (c) ferric chloride or other halide salt without hydrohalide acid; (d) stannic chloride or other stannic halide preferably with hydrochloric or other hydrohalide acid and (e) halides of phosphorus, antimony or arsenic and more particularly the pentachlorides of phosphorus or antimony with or without hydrohalide acid. Other catalysts which may be used are, for example, phosphoric acid and sulphuryl chloride.

The esterification in suspension in ether presents particular advantages in that it allows of controlling very rigidly the temperature of the acetylation. It is well-known that high temperatures in the esterification process bring about degradation of the cellulose molecule. By using ether and carrying out the esterification under ordinary atmospheric pressure, the temperature of the esterification is limited by the boiling point of the ether and may in fact be carried out at its boiling point using a reflux condenser. Similarly other liquids having varying boiling points may be employed for the esterification so as to exercise a rigid temperature control, the temperature varying for instance with the nature and quantity of catalyst used. Thus for instance zinc chloride may require higher temperatures than sulphuric acid under otherwise equivalent conditions.

The ripening treatment according to the present invention may be carried out in presence of inorganic or organic acids or acid salts or salts having an acid reaction (e. g. ferric chloride) or with aromatic amines, for instance aniline, or salts thereof at ordinary or raised temperatures. Preferably the catalysts employed in the esterification are also present in the ripening treatment. Again, as in the esterification in presence of ether or like liquid, the ether or the like may admit of a rigid control of the ripening temperature. For example, as with the esterification, ripening may be carried out at the boiling point of the ether under a reflux condenser.

The suspending liquid used in the ripening may be run off from the apparatus and either used again for a further ripening, or, if a continuous process is to be used for the esterification and ripening, it may be used for a further esterification, additional amounts of anhydride being added if the liquor is to be used for esterification, and if required additional amounts of catalyst and ether or similar liquid according to the amount thereof which has been used up. Alternatively or in addition the ether and acid (which was either added initially in the esterification or resulted from the esterification) may be subjected to a distillation process or other suitable process for the purpose of recovering the constituents. As a particular instance of a recovery method, a part of the ether-acid mixture may be separated into its constituents, the ether being returned to the process and the acid reconverted to anhydride, while the remaining part is returned to the process to be used in a further esterification and/or ripening. The cellulose acetate or other cellulose ester remaining in the ripening apparatus may be washed with ether or other suitable liquid so as to extract any acid remaining therein and may then if desired be washed with hot water or other liquid to recover the ether or similar liquid used either in the ripening or previous washing operation.

The following examples are intended to illustrate the invention but not to limit it in any way:—

*Example 1*

100 parts of cotton linters are soaked in a mixture of 400 parts of glacial acetic acid and 5–12 parts of sulphuric acid for 1 to 24 hours and preferably for 3 to 12 hours. The whole is then added to a mixture of 1000 parts of ether and 300 parts of acetic anhydride in an acetylator fitted with a reflux condenser and a suitable stirrer. The temperature is brought to about 30 to 35° and allowed to remain at that figure until a test sample shows that the required degree of acetylation has been attained. Lower temperatures may of course be used. 30 to 125 parts or more and preferably 50–100 parts of water are then added to the primary cellulose acetate suspension and the ripening treatment continues at about 30 to 35° C. until the required solubility is reached. It is found that combined $SO_3$ is completely eliminated in about 5 to 12 hours. The suspending liquor may then be run off as described above and the secondary cellulose acetate washed, first with ether and then with hot water, and finally washed in the usual manner.

Instead of employing a mixture of sulphuric acid and acetic acid in the pretreatment, the cellulose may be pretreated with a mixture of the acetic acid and the ether and thereafter the sulphuric acid and acetic anhydride added. Similarly any other form of pretreatment described above may be employed.

Example 2

100 parts of cotton linters are pretreated with formic acid, for example by treatment with 500 to 1000 parts or more of formic acid of about 85% strength, allowing to stand for some hours in the cold and hydroextracting or by passing the vapours of formic acid for some hours through the cellulose contained in a suitable drum. The pretreated cellulose, from which the formic acid has been substantially removed, is then introduced into an acetylator containing 800 parts of ether, 350 parts of acetic anhydride and 5 to 12 parts of sulphuric acid, the acetylator being fitted with a reflux condenser and a suitable stirrer. The temperature is brought to about 30 to 35° C. and allowed to remain at that figure until a test sample shows that the required degree of acetylation has been obtained. The ripening may then be effected as described in Example 1.

Example 3

100 parts of cellulose are soaked in 400 parts of glacial acetic acid for about 3 to 12 hours. The whole is then added to a mixture of 1100 parts of ether, 350 parts of acetic anhydride and 6 to 10 parts of sulphuric acid contained in an acetylator fitted with a reflux condenser and a suitable stirrer. The acetylation and ripening may thereafter be carried out as described in Example 1.

Although the invention has been more particularly described above with reference to the use of ether as the suspending liquid in the esterification and in the ripening treatment, other liquids may be used in which water or similar acting agent, which is added to destroy the esterifying agent and to promote ripening, is soluble or miscible. Furthermore the invention, in addition to including a ripening which is carried out in suspension throughout, also contemplates the case in which a diluent is used which at the beginning of the ripening treatment is a non-solvent for the cellulose ester, but in which as a result of the ripening treatment the cellulose ester becomes progressively more soluble. Or alternatively, it may first become more soluble in the suspending liquid and then progressively less soluble so that during ripening treatment the cellulose ester has first become dissolved and subsequently been again precipitated. The only criterion to be observed is that the water or similarly acting agent employed in the ripening treatment shall be to some appreciable extent miscible with or soluble in the suspension of the primary ester. Mixtures of ether or like liquids with benzol or the like may be used. As examples of other suitable liquids the following may be mentioned:—methyl acetate, ethyl acetate, other ethers or acetone. Furthermore instead of employing water for the ripening treatment other agents capable of destroying acetic anhydride or other esterifying agent and promoting the ripening may be employed, for example hydroxy bodies such as alcohols, oxy acids and the like, e. g. ethyl alcohol, glycerin and lactic acid.

Again instead of employing anhydrides for the esterification, as more particularly described above, other esterifying agents, such as acid chlorides, may be used.

What I claim and desire to secure by Letters Patent is:—

1. Process for the manufacture of carboxylic acid esters of cellulose comprising ripening primary organic esters of cellulose in suspension in a liquid organic medium with which the ripening agent is miscible at least to a sufficient extent to enable the ripening to be effected.

2. Process for the manufacture of carboxylic acid esters of cellulose comprising ripening primary organic esters of cellulose by means of water, in suspension in a liquid organic medium in which water is miscible at least to an extent sufficient to enable the ripening to be effected.

3. Process according to claim 2 wherein ether is employed as suspending liquid.

4. Process for the production of carboxylic acid esters of cellulose comprising esterifying material consisting essentially of cellulose in suspension in a hydrocarbon of the benzene series, and ripening the primary organic esters of cellulose in suspension in a liquid organic medium with which the ripening agent is miscible at least to a sufficient extent to enable the ripening to be effected.

5. Process for the manufacture of cellulose acetate comprising ripening primary cellulose acetate in suspension in a liquid organic medium with which the ripening agent is miscible at least to a sufficient extent to enable the ripening to be effected.

6. Process for the manufacture of cellulose acetate comprising ripening primary cellulose acetate by means of water, in suspension in a liquid organic medium in which water is miscible at least to an extent sufficient to enable the ripening to be effected.

7. Process according to claim 6 wherein ether is employed as suspending liquid.

8. Process for the production of cellulose acetate from material consisting essentially of cellulose characterized in that both acetylation and ripening are carried out in suspension in a liquid organic medium with which the ripening agent is miscible at least to a sufficient extent to enable the ripening to be effected.

9. Process for the production of cellulose acetate from material consisting essentially of cellulose characterized in that both acetylation and ripening are carried out in suspension in an ether.

10. Process for the production of cellulose acetate from material consisting essentially of cellulose characterized in that both acetylation and ripening are carried out in suspension in dethyl ether.

11. Process for the production of cellulose acetate from material consisting essentially of cellulose characterized in that both acetylation and ripening are carried out in suspension in a liquid organic medium with which the ripening agent is miscible at least to a sufficient extent to enable the ripening to be effected, and in the presence of sulphuric acid.

12. Process for the production of cellulose acetate from material consisting essentially of cellulose characterized in that both acetylation and ripening are carried out in suspension in an ether, and in the presence of sulphuric acid.

13. Process for the production of cellulose acetate comprising pre-treating material consisting essentially of cellulose with organic acids and thereafter acetylating in suspension in a liquid organic medium with which a ripening agent is sufficiently soluble to enable ripening to be effected.

14. Process for the production of cellulose acetate comprising pre-treating material consisting essentially of cellulose with organic acids, acetylating in suspension in a liquid organic medium with which a ripening agent is sufficiently soluble to enable ripening to be effected, and in the presence of sulphuric acid, and thereafter ripening in situ.

15. Process according to claim 14 wherein ether is employed as the suspending liquid.

16. Process for the production of cellulose acetate comprising pretreating material consisting essentially of cellulose with organic acids together with esterification catalysts and thereafter acetylating in suspension in a liquid organic medium with which a ripening agent is sufficiently soluble to enable ripening to be effected.

17. Process for the production of cellulose acetate comprising pretreating material consisting essentially of cellulose with lower aliphatic acids together with esterification catalysts and thereafter acetylating in suspension in a liquid organic medium with which a ripening agent is sufficiently soluble to enable ripening to be effected.

18. Process according to claim 16 wherein acetylation is effected by means of acetic anhydride.

19. Process for the ripening of cellulose esters of fatty acids, characterized in that the ripening is carried out in an organic medium in which the cellulose ester is initially insoluble and in which the ripening agent is sufficiently soluble to enable the ripening to be effected.

20. Process for the ripening of cellulose esters of fatty acids, characterized in that the ripening is carried out in an organic medium in which the cellulose ester is insoluble throughout the ripening treatment and in which the ripening agent is sufficiently soluble to allow the ripening to be effected.

HENRY DREYFUS.